United States Patent [19]
Spada et al.

[11] Patent Number: 5,699,896
[45] Date of Patent: Dec. 23, 1997

[54] TRANSFER DEVICE, AND IN PARTICULAR, A PACKAGING MACHINE FOR CIGARETTES OR THE LIKE, WHICH IS PROVIDED WITH THE SAID TRANSFER DEVICES

[75] Inventors: Walter Spada, Marzabotto; Orazio Di Camillo, Ferrara, both of Italy

[73] Assignee: SASIB S.p.A., Bologna, Italy

[21] Appl. No.: 434,914

[22] Filed: May 4, 1995

[30] Foreign Application Priority Data

May 11, 1994 [IT] Italy ................ GE94A0057

[51] Int. Cl.[6] ............................................. B65G 25/04
[52] U.S. Cl. ............... 198/747; 198/468.11; 198/418.3; 198/370.07; 198/370.02; 74/105; 74/106
[58] Field of Search ......................... 74/418.3, 747, 74/468.11, 370.07, 370.02, 105, 106

[56] References Cited

U.S. PATENT DOCUMENTS

| | | |
|---|---|---|
| 1,769,650 | 7/1930 | Rose . |
| 3,026,988 | 3/1962 | Fisk ............................. 198/370.07 |
| 3,426,994 | 2/1969 | Daniel, Jr. ...................... 74/105 |
| 3,581,806 | 6/1971 | Neumann ........................ 74/105 |
| 3,820,649 | 6/1974 | Fluck ............................ 198/418.3 |
| 3,826,294 | 7/1974 | Rademacher . |
| 4,139,108 | 2/1979 | Kamp et al. ................... 198/468.11 |
| 4,297,908 | 11/1981 | Zimmer ......................... 74/106 |
| 4,323,009 | 4/1982 | Voigt ............................. 74/105 |
| 4,750,605 | 6/1988 | Brems et al. ................... 74/105 |
| 5,010,998 | 4/1991 | MacMillan ...................... 198/370.07 |

FOREIGN PATENT DOCUMENTS

| | | | |
|---|---|---|---|
| 803317 | 1/1969 | Canada ...................... 198/418.3 |
| 1721339 | 3/1992 | U.S.S.R. ...................... 74/105 |

Primary Examiner—William E. Terrell
Assistant Examiner—Khoi H. Tran
Attorney, Agent, or Firm—Larson & Taylor

[57] ABSTRACT

A transfer device includes a transfer tool which is activated by a rectilinear guide, i.e. by a mechanism made such that a point of attachment of the transfer tool describes a rectilinear trajectory when the guide is activated. A drive element for activating the guide is provided with non-rectilinear motion, and in particular with angular motion. Preferably, the rectilinear guide consists of an articulated oscillating linkage. The transfer device is used in a packaging machine for cigarettes or the like, in which, whenever possible, for each transfer of product into the processing path of the machine, rectilinear transfer units for the products are used, which transfer units are actuated by transfer devices activated by articulated oscillating linkages.

15 Claims, 8 Drawing Sheets

TRANSFER DEVICE, AND IN PARTICULAR, A PACKAGING MACHINE FOR CIGARETTES OR THE LIKE, WHICH IS PROVIDED WITH THE SAID TRANSFER DEVICES

BACKGROUND AND SUMMARY OF THE INVENTION

The subject of the invention is a transfer device, and in particular a packaging machine for cigarettes or the like, in which the transfer devices are provided.

In particular, in machine tools which have a plurality of processing units through which the product is passed, for example in packaging machines for cigarettes or the like, in order to guarantee a high output, i.e. a large number of finished products per unit of time, the transfer means have to operate at very high speeds and frequencies, and in a way which is perfectly synchronized with the mechanisms of all the operative units. The various types of rectilinear transfer units currently known are unreliable in terms of both operating speed, and long-term accuracy and consistency of synchronization, so that specific mechanical solutions must be planned according to the various requirements. Often, and in particular in machines for the production and packaging of cigarettes, problems of speed and synchronization are solved by transferring the products along arcuate paths, with the assistance of drums or the like. In addition to extending the path travelled, the means for transferring products along arcuate paths are relatively heavy, and thus give rise to considerable inertia of motion, which necessitates oversized motorization means. Additionally, each transfer unit requires specific transfer means which are specially produced, and in order to obtain longer and more complex paths, a series of successive transfer means may need to be provided.

The object of the invention is thus to provide a transfer device of the type initially described, which permits transfer along a rectilinear path, and which, despite a relatively simple structure and lower inertia of motion, permits accuracy of rectilinear movement of the transfer tool within tolerances which are also acceptable for long transfer paths, high frequency of operation, and a high level of adaptability to a wide range of transfer requirements, requiring minimal, inexpensive structural variations.

The above-described aims are achieved according to the invention by means of a transfer device of the type initially described, which comprises a transfer tool which can be moved at least along a rectilinear path by movement of a rectilinear guide, i.e. a mechanism made such that a point of attachment of the transfer tool describes a rectilinear trajectory when the guide is moved, whereas the drive element for moving the guide is provided with non-rectilinear motion, and in particular with angular motion, and which rectilinear guide consists of an articulated oscillating linkage.

The articulated oscillating linkage can consist of an articulated three-bar linkage or an articulated three-bar linkage, and is made such that the elements which constitute it have the minimum inertial mass possible and the maximum rectilinear path of transfer, within very low tolerances of deviation from the rectilinear path.

The articulated three-bar linkage has two oscillating end arms pivoted around two stationary axes and connected to one another by an intermediate coupling arm, to which there is articulated the transfer tool, preferably at a point other than that of the oscillating arms.

The articulated three-bar linkage extends from the articulated three-bar linkage, an articulated rod being disposed between one of the two oscillating end arms and the intermediate coupling arm.

At least one of the two oscillating end arms can be activated, and constitutes the oscillating drive arm of the articulated oscillating linkage, whereas the other oscillating driven arm is free.

According to an improvement, the articulated oscillating linkage is associated with a parallel linkage ("parallel" when considered together with the drive arm, the coupling arm and the transfer tool to which the latter is articulated) in which there is provided a rocker arm which pivots idly around a stationary axis and is parallel to the drive arm, whereas it is articulated on one side to the transfer tool by means of a guide arm which is parallel to the drive arm, and on the other side to the drive arm itself, by means of a connection arm.

According to a further improvement, in order to allow the transfer tool to move in accordance with two components which are perpendicular to one another, i.e. such that the return course takes place along a path other than the rectilinear path of advance, in the case of the articulated three-bar linakge means are provided for transverse movement of the axis of pivoting of the rocker arm relative to the rectilinear course of advance. In this case, the articulated three-bar linkage is advantageously disposed in a position at the rear of the articulated parallel linkage of which it is a part, with reference to the course of advance.

However, when the transverse course of the transfer tool needs to be perfectly rectilinear and perpendicular to the course of advance, at least for an initial part of the transverse course, the configuration is advantageous in which an articulated three-bar linkage is provided in a position at the front of the articulated parallel linkage, with reference to the course of advance, whereas both oscillating arms of the articulated three-bar linkage can be activated independently, and in a manner synchronized with one another.

The articulated oscillating linkages which are associated with an articulated parallel linked, can easily be adapted to various transfer requirements, and in particular to various transfer courses. Advantageously, this can be obtained by maintaining the angles of rotational activation of the oscillating arm or arms constant, and by varying the length of the arms which constitute the articulated oscillating linkages and any associated articulated parallel linkage, such as to maintain the ratio between these lengths constant, i.e. using configurations of articulated oscillating linkages and articulated parallel linkage associated with the latter which are said to be similar in the sense of the geometric definition of the term.

The subject of the invention is also a machine tool, and in particular a packaging machine for cigarettes, in which substantially all transfers of the product along the processing path, which can be obtained with transfers along rectilinear paths, are implemented by means of the said transfer devices.

The invention also relates to other features which further improve the aforementioned transfer device, and which are the subject of the sub-claims.

BRIEF DESCRIPTION OF THE DRAWINGS

The specific features of the invention and the resulting advantages will become apparent in greater detail from the description of some preferred embodiments, illustrated by way of non-limiting example in the attached drawings, in which.

DESCRIPTION OF THE PREFERRED EMBODIMENT OF THE INVENTION

Figures 1, 2:
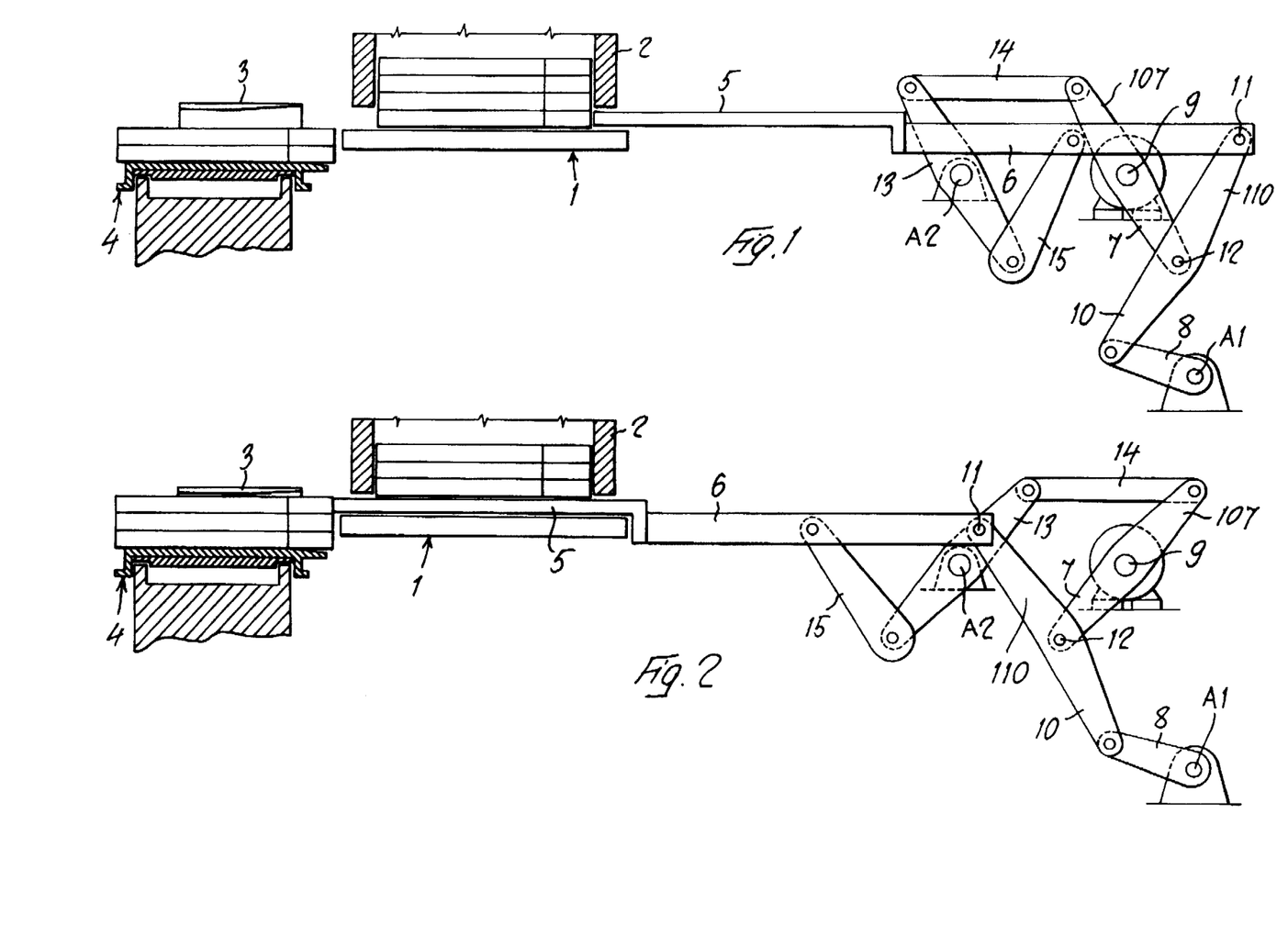
FIGS. 1 and 2 illustrate schematically a lateral view of a transfer device according to the invention in its configuration in which it can perform alternate movements of advance and return along a rectilinear path, and in particular in the form of a device for transferring rows of cigarettes from a station which forms the rows, into a tubular housing for forming ordered groups of cigarettes in a cigarette packaging machine.
Figures 3, 4:
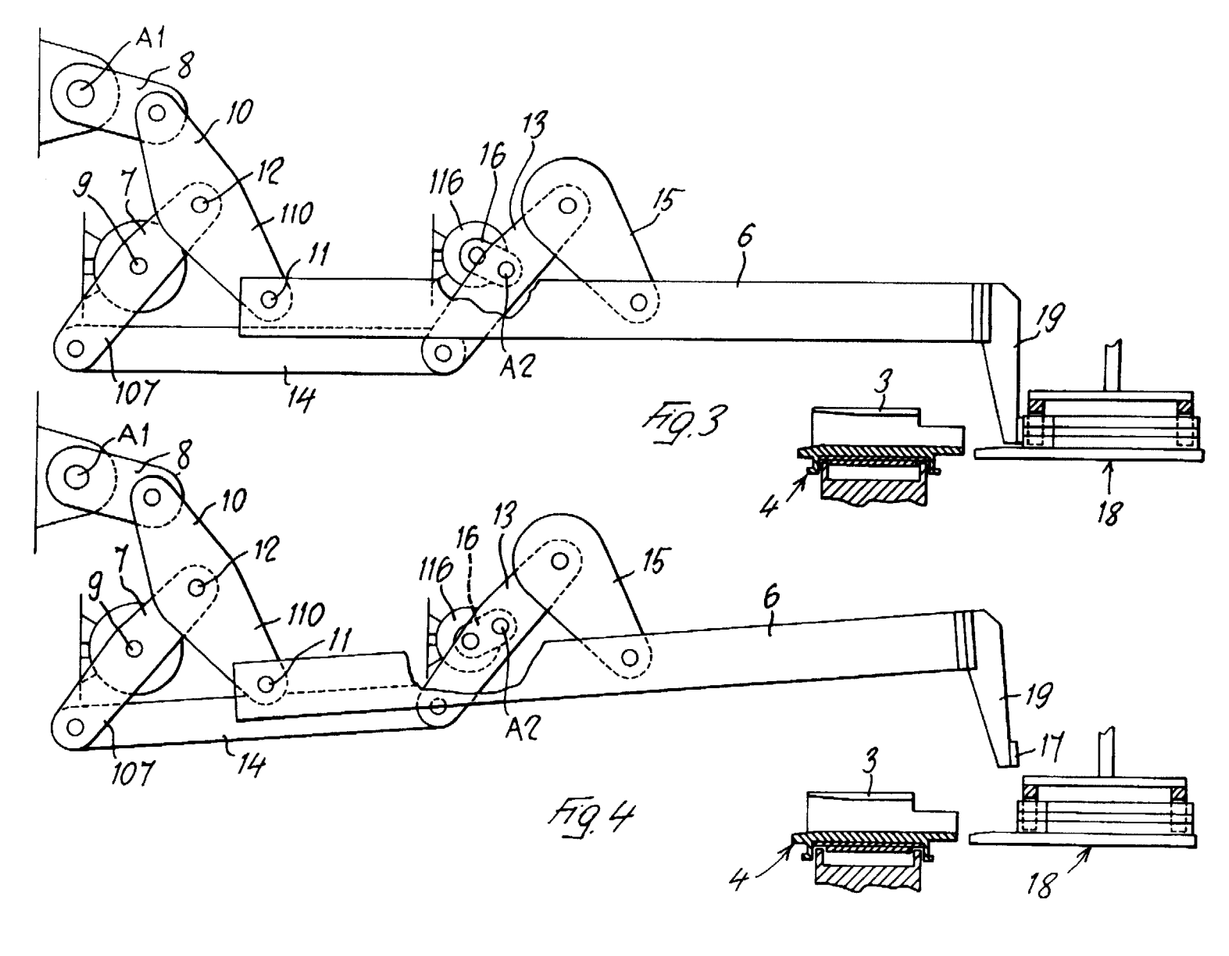
FIGS. 3 to 6 illustrate lateral views in the different end positions of a transfer device according to the invention, which can execute a combined movement according to two components of motion at right angles, and is in the form of a device for transferring an ordered group of cigarettes from the tubular housings of a conveyor with boxes on a guide for transferring the latter to a folding wheel supply station.
Figures 5, 6:
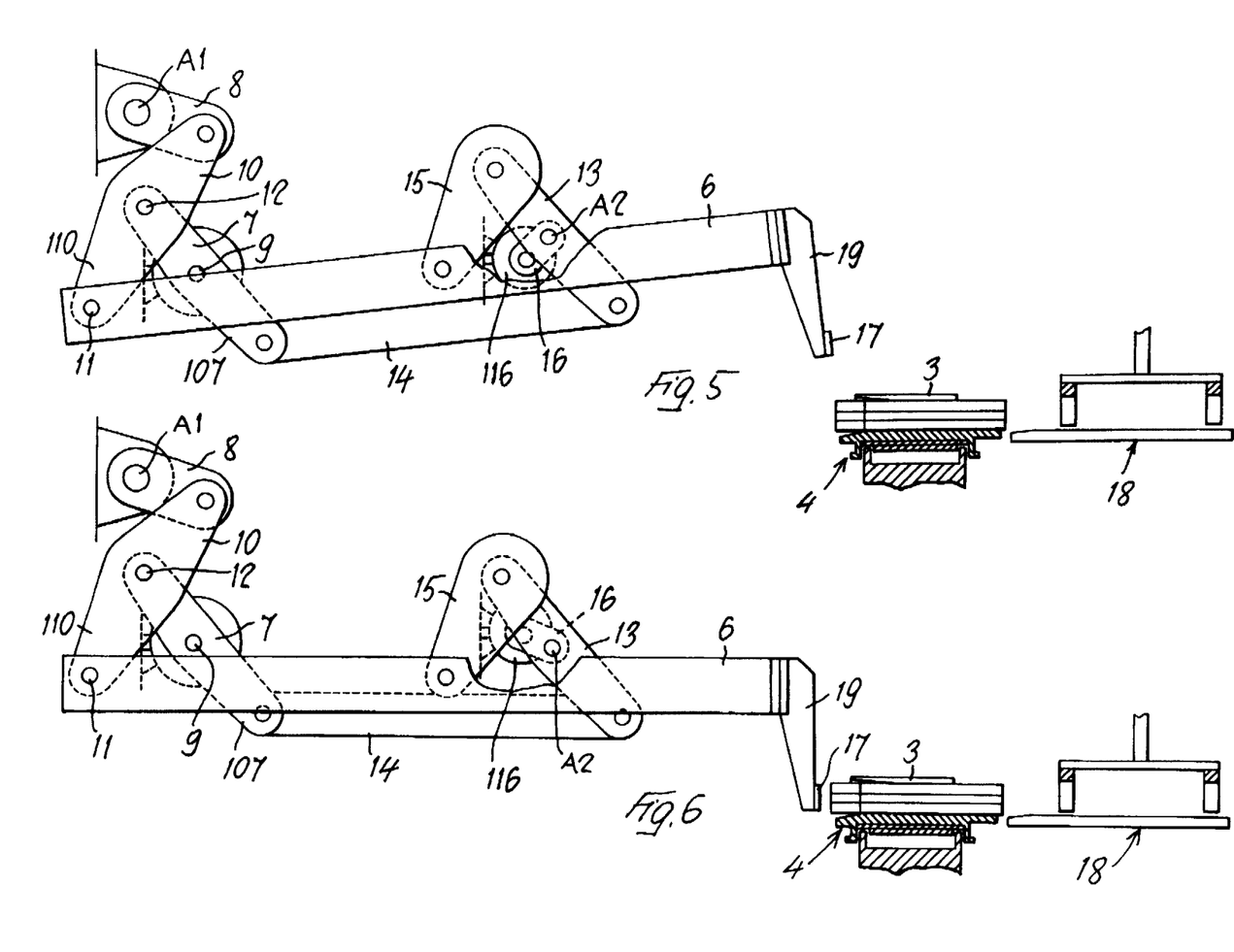

FIGS. 1 and 2 illustrate a transfer device according to the invention for transferring rows of cigarettes which are adjacent to one another, from a station 1 for forming the rows beneath a hopper 2, into a tubular housing 3 of a so-called box-type conveyor belt 4. According to this embodiment, the transfer device is made so that a thrust pallet, 5 performs an alternate rectilinear movement in the axial direction of the cigarettes, in order to take the row of cigarettes from the formation station 1 into the tubular housing 3. The thrust pallet 5 projects from the end of a tool-holder rod 6. The rod 6 is activated axially by means of an articulated three-bar linkage which comprises two oscillating end arms 7 and 8, one of which, a drive arm 7, is attached to a motorized, stationary drive shaft 9, whereas the other driven arm 8, is pivoted such as to oscillate freely around a stationary axis A1 which is parallel to the axis of the drive shaft 9. The end drive arm 7 is connected to the end driven arm 8 by means of an intermediate coupling arm 10, whereas to the latter, at a point of articulation 11 other than those of the end arms 7 and 8, and in particular to an extension 110 of the intermediate coupling arm 10, there is attached the rear end of the tool-holder rod 6. The two end, drive and driven arms 7, 8 are oriented according to straight lines which converge towards one another, i.e. which intersect one another, and the dimensions of the assembly are such that the point of articulation 12 of the drive arm 7 to the intermediate coupling arm 10 passes from one side to the other of the joining line of the drive shaft 9 and the axis A1 of pivoting of the driven arm 8. The drive shaft 9 and the fulcrum axis A1 of the driven arm 8 are disposed on the same side of the rectilinear path of the thrust pallet 5, i.e. of the tool-holder rod 6, the drive shaft 9 being closer to the rod 6, and offset slightly forwards in the direction of advance of the thrust pallet 5, relative to the axis of pivoting A1 of the driven arm 8.

On the side opposite the drive shaft 9, the drive arm 7 has an extension 107, with which it forms part of an associated articulated parallel linkage, which consists of a rocker arm 13, which is pivoted such as to rotate idly around a stationary axis A2 which is parallel to the drive shaft 9, which axis A2 passes through the median point of the rocker arm 13. The rocker arm 13 is parallel to the end drive arm 7 with its extension 107, and is connected to the extension 107 by means of a connection arm 14, which is parallel to the tool-holder rod 6, and with its end on the same of the said tool-holder rod 6. The opposite end of the rocker arm 13 is articulated to a guide arm 15, which is parallel to the extension 110 of the intermediate coupling arm 10 and which is articulated to the tool-holder rod 6 itself.

The axis of pivoting A2 of the rocker arm 13 and the axis drive shaft 9 form a plane parallel to the rectilinear path of the thrust pallet 5, i.e. to the tool-holder rod 6.

As is apparent from the figures, the alternate angular motion in one direction or the other of the drive shaft 9 for a predetermined angle, gives rise to movement of the thrust pallet 5 along a rectilinear path, in a direction of advance and return.

The dimensions of the arms which constitute the articulated three-bar linkage and the articulated parallel linkage are such that the assembly has the lowest possible inertial mass. In addition, the ratio between the length of the arms is chosen so as to obtain very low tolerances of deviation from the rectilinear path during advance and return, this being for a path of approximately the length of a cigarette or even slightly longer.

When producing a transfer device with a larger or smaller transfer course, and which has similar relative tolerances, it is sufficient to produce a device which has the same geometry as that described above, and in which the length of the arms is increased or decreased in accordance with the ratio between the paths, and such as to maintain the ratio between the length of the individual arms constant. In other words, it is sufficient to produce a device which is similar in the geometric sense of the term, which corresponds to the ratios between the courses. In this condition, the considerable advantage is obtained of having the same angular amplitudes of rotation of the drive shaft 9 for any type of device, thus avoiding adaptation of the drive mechanisms, which can be maintained unchanged.

According to a further feature of the transfer device, and as illustrated in FIGS. 3 to 6, it may be necessary to have a transfer device which has a rectilinear course of advance, and a return course which does not coincide with the course of advance, i.e. a transfer device, the transfer tool of which performs combined movements according to two components of motion which are perpendicular to one another. In this case, according to a first embodiment, it is sufficient to provide drive means for translation of the axis of pivoting A2 of the rocker arm 13, for movement thereof at least along a component which is transverse or perpendicular to the rectilinear motion of advance. Advantageously, in the articulated parallel linkage, the rocker arm 13 is disposed in a front position with reference to the advance movement, whereas the articulated quadrilateral is disposed in a rear position. With reference to the example in FIGS. 3 to 6, at its axis of pivoting A2, the rocker arm 13 is articulated to an oscillating, transverse movement arm 16, which is attached so as to rotate together with the latter, on a motorized drive shaft. The drive shaft is connected to motorized rotational drive means 116, which are synchronized with the motorized drive means of the end drive arm 7 of the articulated quadrilateral. The example illustrated in FIGS. 3 to 6 shows a transfer device, the structure of which is substantially similar to that in FIGS. 1 and 2, and the parts with the same functions are indicated with the same reference numbers. The transfer device is shown in the form of a unit for transferring ordered groups of cigarettes from a tubular housing 3 of a conveyor 4 with boxes into a guide 18 for transferring the latter to a station for supplying the ordered group of cigarettes, together with a wrapping sheet, to a so-called folding drum 24 (FIG. 10), by means of which the sheet is folded around the group of cigarettes. The tool-holder rod 6 supports a transverse thrust plate 17 with a surface which is complementary to the transverse section of the tubular housings 3. The plate is attached to the tool-holder rod 6 by means of a thin bracket 19 which projects at an angle downwards from the end of the tool-holder rod 6, and which during advance movement passes through a slot 103 (FIG. 11) in the opposite wall of the tubular housing 3. In order to enable the box-type conveyor 4 to advance immediately after the rectilinear movement of transfer of the group of cigarettes from the position in FIG. 6 to the position in FIG. 3, before the angular motion of the drive arm 7 is inverted in order to execute the return course, there is rotated in a synchronized manner the drive arm 16 for transverse movement of the tool 17, which is thus brought into a position which is offset relative to the box-type conveyor 4 (FIG. 4), such that the return course can be executed along a path which does not interfere with the box-type conveyor 4. At the end point of the return end of travel (FIG. 5), the transverse movement arm 16 is activated in the opposite direction, thus realigning the tool 17 on the path of rectilinear movement of transfer, behind the corresponding head side of the new tubular housing 3.

However, this solution does not permit execution of transverse movement which is perfectly perpendicular to the rectilinear path of advance of the tool.

Figure 7:
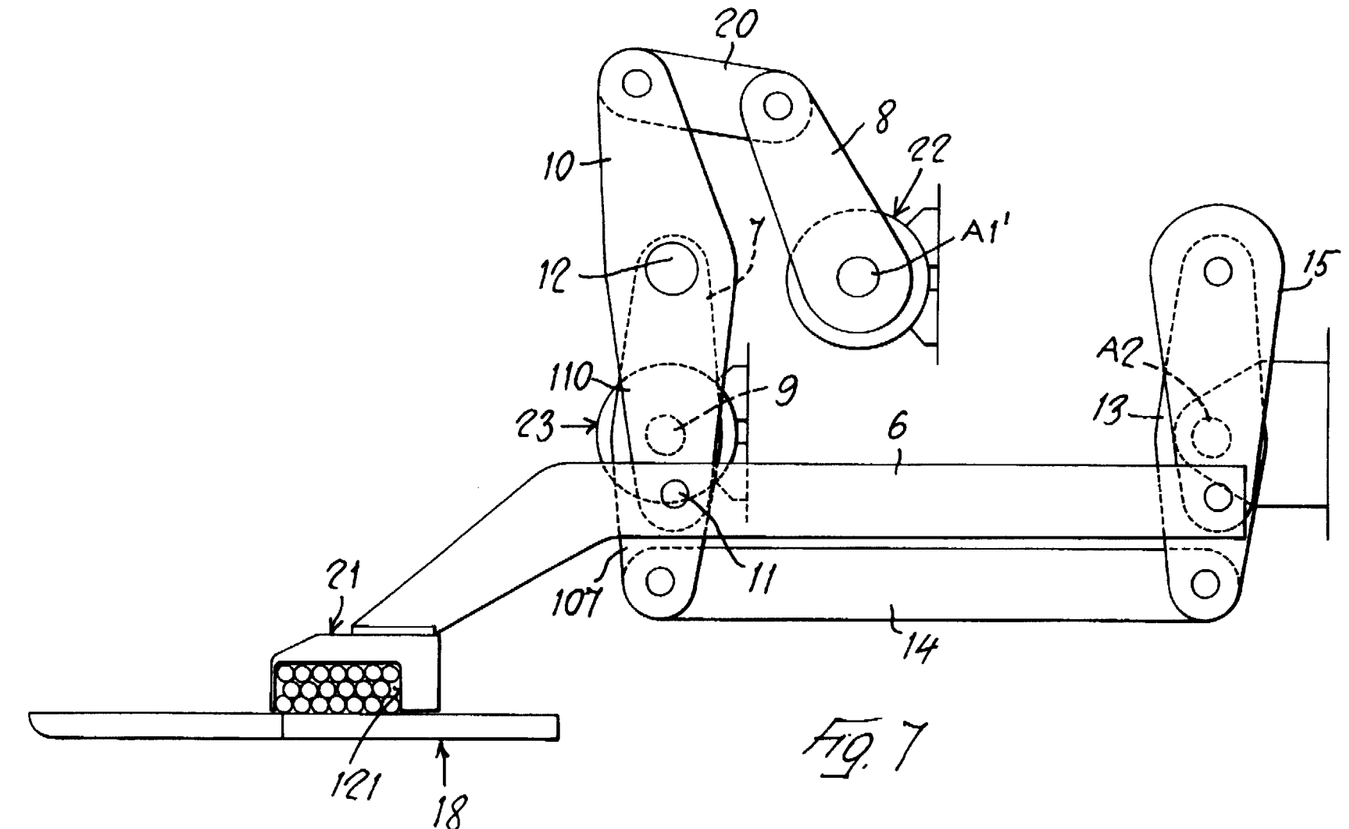
FIGS. 7 to 9 illustrate a lateral view in three different positions of a variant embodiment of a transfer device which can execute a combined movement according to two components which are at right angles to one another, in the form of a device for transferring ordered groups of cigarettes along a transfer guide, to a station for supplying a folding wheel of a cigarette packaging machine.
Figure 8:
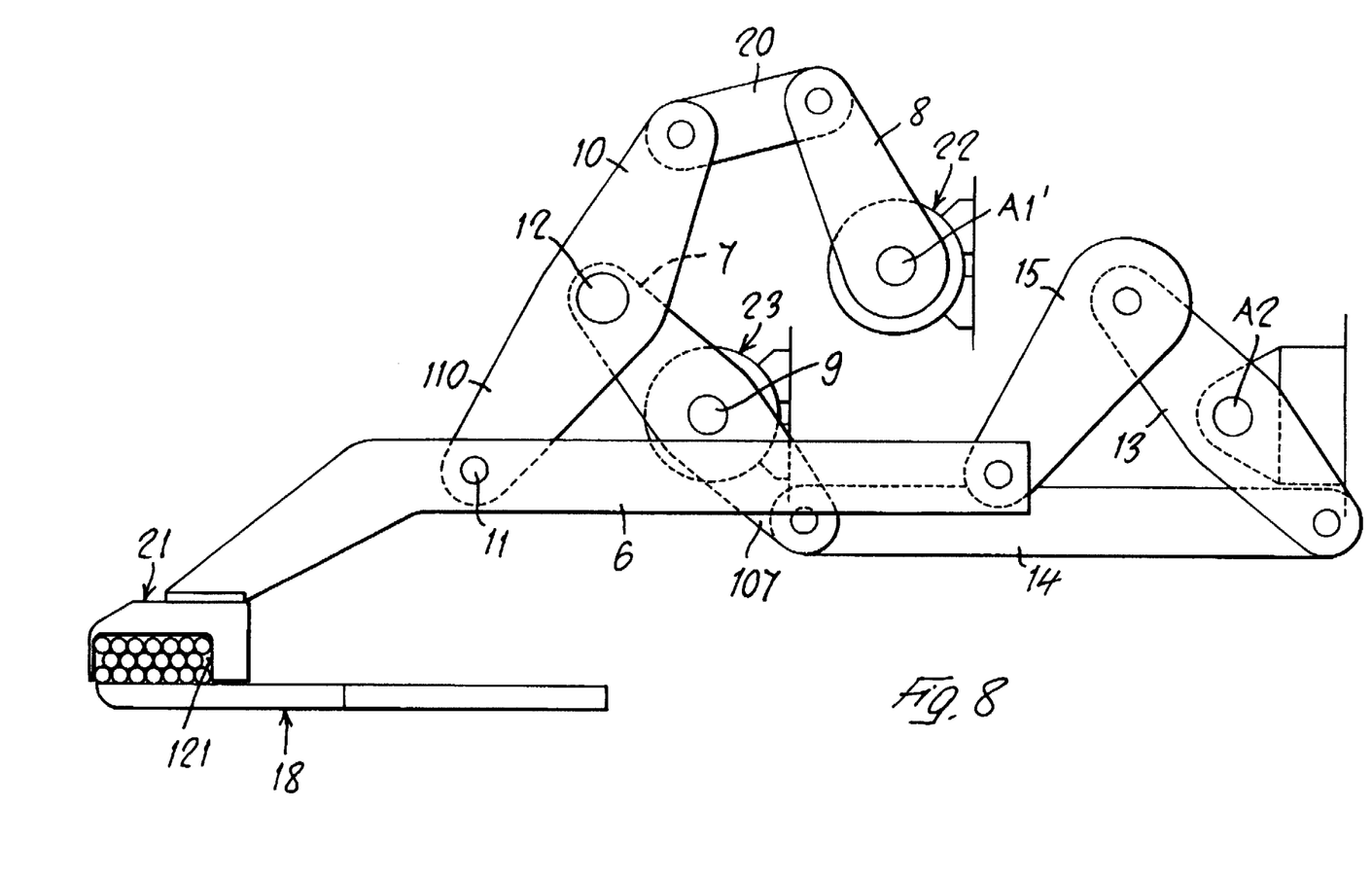
Figure 9:
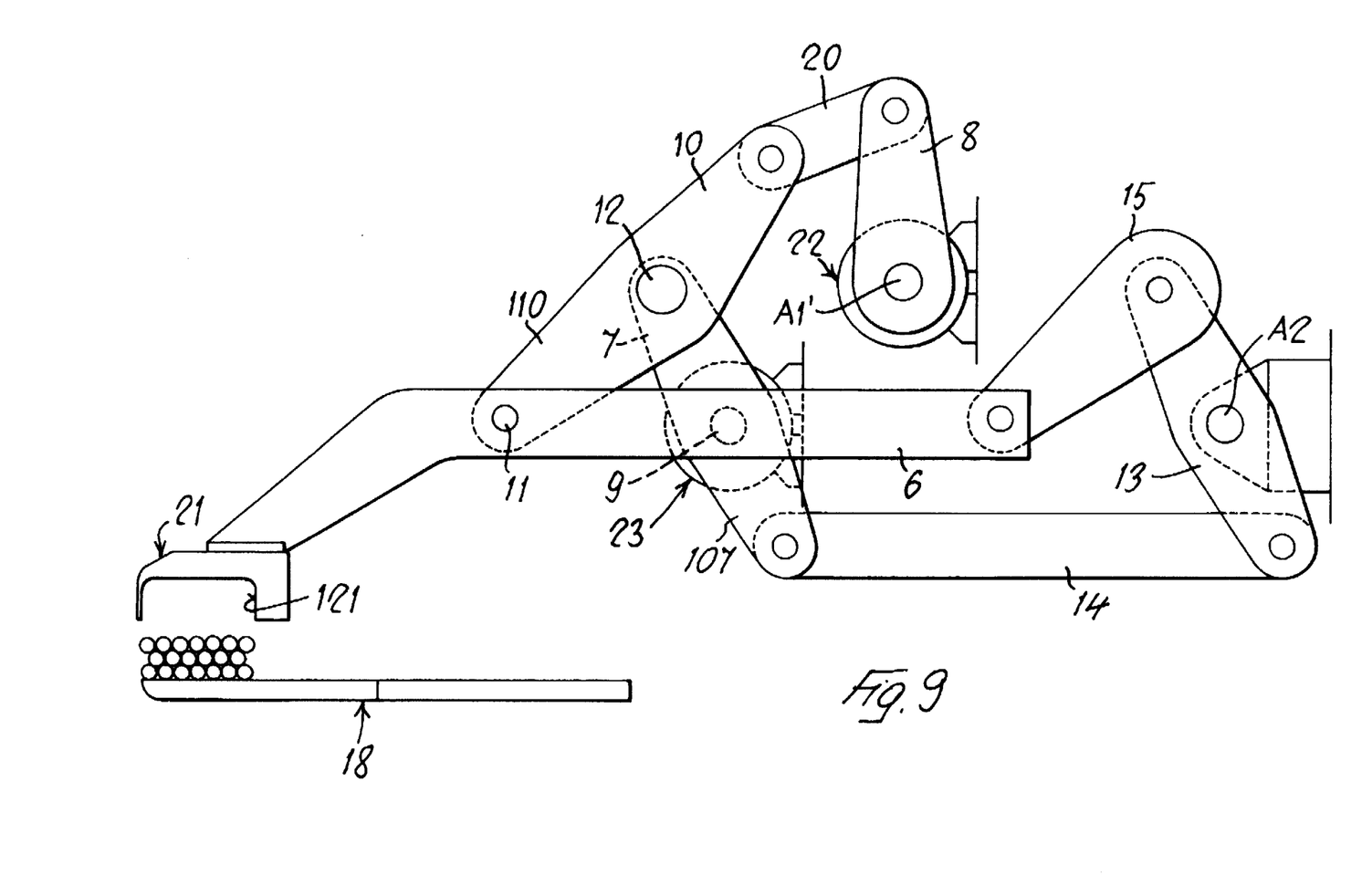

A solution in which this is possible at least for an initial partial section of the transverse course, according to the perpendicular component of motion, is shown in FIGS. 7 to 9. In this variant, the articulated multilateral used is an articulated three-bar linkage which extends from the articulated quadrilateral of the preceding variants, by means of an articulated rod 20 between the intermediate coupling arm 10 and the oscillating end driven arm 8. In addition, in this case also, the tool-holder rod 6 and the end drive arm 7 form part of an articulated parallel linkage which is similar to those previously described, but which differs from the latter in that the articulated three-bar linkage is provided in a front position with reference to the course of advance, relative to the rocker arm 13, which is pivoted such as to oscillate freely around a stationary axis A2, similarly to the examples in FIGS. 1 and 2. When only one (end arm 7) of the oscillating end arms 7, 8 can be activated, the drawing tool 21 performs rectilinear motion of advance and return along the same path. In this case, in order to establish a further component of motion in a direction perpendicular to that of the rectilinear motion of advance, it is sufficient to render mobile also the oscillating end driven arm 8, which thus becomes the motion drive along the perpendicular component. The motorized drive means 22 of the transverse movement oscillating drive arm 8 are independent and synchronized with the drive means 23 of the advance motion drive arm 7. In the example in FIGS. 7 to 9, the transfer device is used to transfer the group of cigarettes along the rectilinear transfer guides 18, from the end of collection of an ordered group of cigarettes from the box-type conveyor 4, into a station for supplying the group of cigarettes, together with a first wrapping sheet, into a folding drum 24. The drawing tool 21 is supported such as to project from the front end of the tool-holder rod 6, which, as in the other examples, is parallel to the direction of advance, i.e. to the direction of transfer. The latter has a collection recess 121 for the group of cigarettes, which is superimposed on the latter from above. In the position of the return end of travel (FIG. 7), the drawing tool 21 forms together with the guides 18 a housing which is coaxial to the tubular housings 3 of the box-type conveyor 4 in the station for collection of the group of cigarettes from the housings, and in which the group of cigarettes is transferred from the tubular housing 3 by means of the transfer device according to FIGS. 3 to 6. In a first stage, only the drive arm 7 of the transfer device is activated, and the drawing tool 21 performs a movement of advance which is rectilinear and parallel to the latter along the guides 18, taking the group of cigarettes into the station for supplying the group of cigarettes to the folding drum 24. In this station, there are provided further mechanisms, not shown in detail, which collect the group of cigarettes and take them into a radial pocket of the folding drum 24. Activation of these mechanisms requires the drawing tool 21 to be moved away from the group of cigarettes, i.e. to be withdrawn from the cigarettes without upsetting the pre-established order of the group. For this purpose, the other transverse movement end drive arm 8 is also activated, so that the drawing tool 21 follows a lifting course according to a path which is perfectly perpendicular to the path of advance, at least for the initial section of disengagement or withdrawal from the group of cigarettes, i.e. substantially corresponding to the height of the latter (FIG. 9). Synchronized and suitably phase-shifted activation in the opposite direction of the two end arms 7 and 8, takes the drawing tool 21 once more into the position shown in FIG. 7, for collection of a new group of cigarettes.

Also in the case of the transfer devices according to the examples in FIGS. 3 to 9, the courses of advance can be adapted by using geometries of the articulated quadrilaterals and parallel linkage which are similar to one another in the sense of the geometric definition of the term, corresponding to the ratios of variation of the required courses, and obtaining the same advantage of using similar angular activation movements of the drive arms.

The articulated five-bar linkage in the example according to FIGS. 7 to 9 has the specific feature that the distances from the point of attachment of the tool-holder rod 6 to the intermediate coupling arm, or to its extension 110 and the axes of pivoting A1, of the oscillating end arms 7, 8, are different from one another. In addition, the articulated rod 20 and the intermediate coupling arm 10 together form an angle, the apex of which is always facing substantially outwards.

Figure 10:
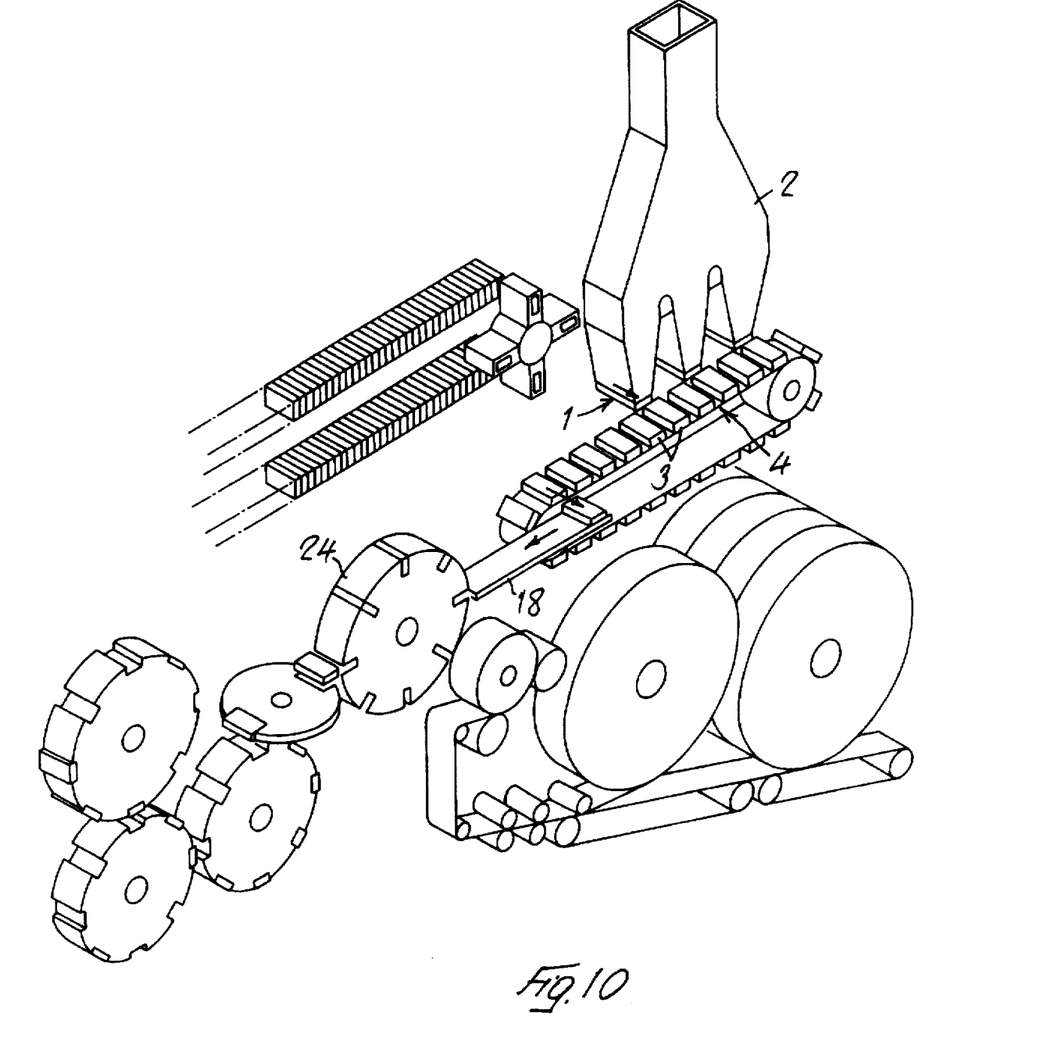
FIG. 10 illustrates schematically the operating mechanisms of part of a cigarette packaging machine, in which the rectilinear transfers of the products in the initial processing stages are shown.
Figure 11:
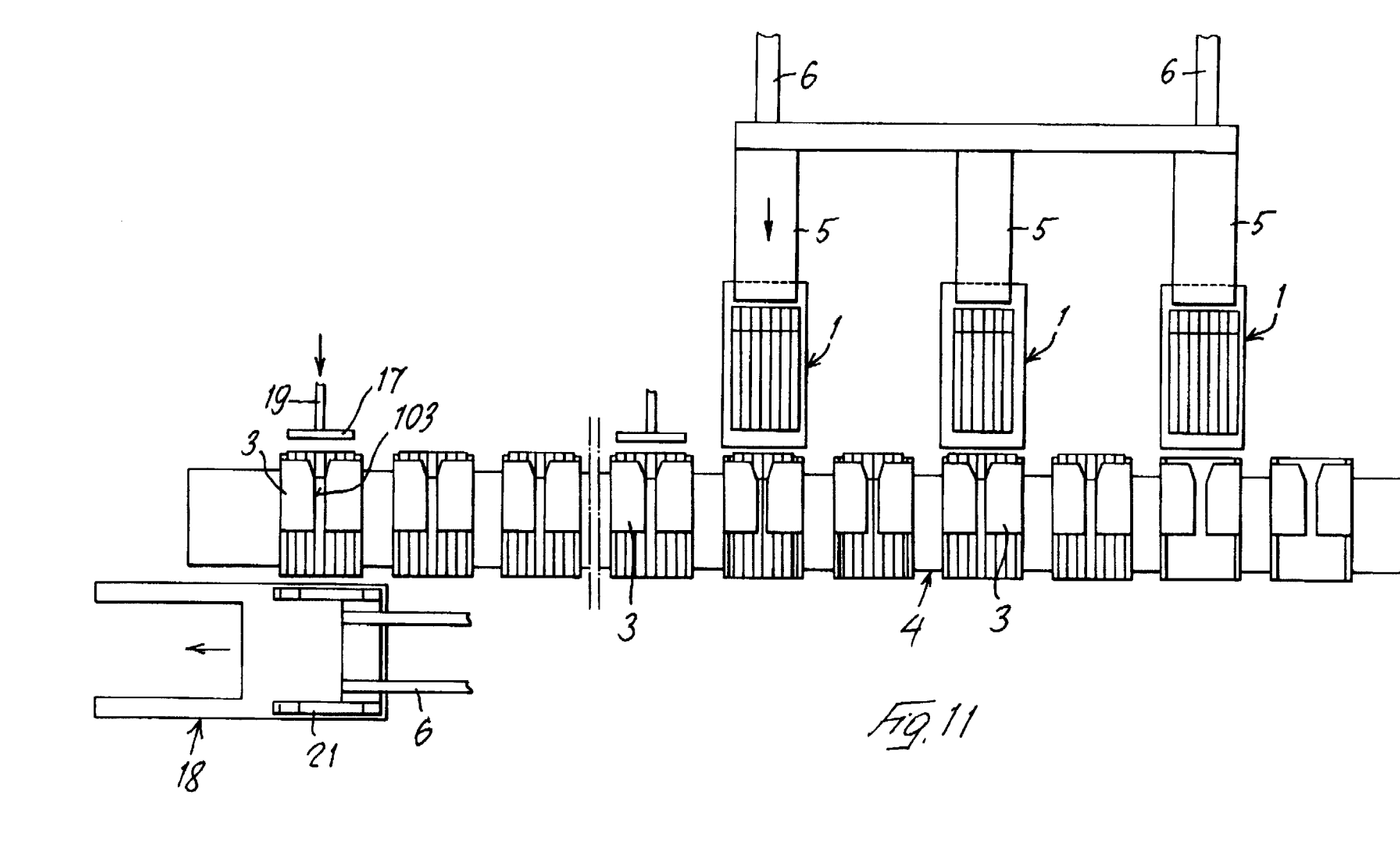
FIG. 11 illustrates schematically a plan view of a cigarette packaging machine, with the corresponding path of the products being processed, from the hopper for supplying the cigarettes to the station for supplying the latter to the folding wheel.

FIGS. 10 and 11 show schematically part of a cigarette packaging machine, and more specifically that part relating to the specific examples of transfer devices illustrated in the preceding figures. It will be appreciated that the use of rectilinear transfer paths for the products during the processing stage, with the assistance of transfer devices of the type according to the preceding description or the like, can also be extended to subsequent stages and parts of the machine which are not specifically illustrated, to replace any arcuate paths and means for actuating the latter. The transfer devices according to the invention can be used in any type of machine, and in particular in any type of machine tool which is provided with a plurality of processing units which operate alternately, and which require high operating speeds and a high level of accuracy and long-term consistency of reciprocal synchronization of the equipment.

We claim:

1. A transfer device comprising:

a transfer tool;

a drive element which moves in an angular motion about a stationary drive axis;

an articulated oscillating linkage which guides said tool from a rear position in a rectilinear trajectory to a front position and back to the rear position, and which is activated by said drive element to cause said tool to move in the guided rectilinear trajectory and back, said oscillating linkage including:

(a) a drive arm having an oscillating drive end and a drive attachment point remote from said drive end at which said drive arm is attached to said drive element such that said drive end of said drive arm is driven in rotation about the drive axis by movement of said drive element, and said drive arm including a drive line extending from said drive attachment point and through said drive end, (b) a driven arm having an oscillating driven end and a driven attachment point remote from said driven end at which said driven end is mounted for rotation about a stationary driven axis passing through said driven attachment point, said driven axis being parallel to said drive axis, and said driven arm including a driven line extending from said driven attachment point and through said driven end, and (c) an intermediate coupling arm having a coupling end attached to said driven end of said driven arm, a tool attachment end remote from said coupling end attached to said tool, and an intermediate portion located between said coupling end and said tool attachment end, said intermediate portion including an intermediate point of attachment to said drive end of said drive arm so that said coupling arm connects said drive end of said drive arm to said driven end of said driven arm, whereby said tool attachment end and hence said tool moves in the guided rectilinear trajectory when said drive end of said drive arm is rotated by said drive element; and wherein, with said drive and driven lines projected onto a common plane perpendicular to said drive axis, (a) when said tool is in the front position, said drive line and said driven line are one of convergent or divergent to one another, and (b) when said tool is in the rear position, said drive line and said driven line are the other one of convergent or divergent to one another.

2. A transfer device as claimed in claim 1;

wherein said drive axis and said driven axis define a joining line therebetween; and wherein said intermediate point of attachment moves from one side of said joining line to the other as said tool moves from the front position to the rear position.

3. A transfer device as claimed in claim 1, wherein said oscillating linkage further includes respective linkage arms which remain parallel to said coupling arm, said drive arm, and the rectilinear trajectory as said tool moves from the front position to the rear position.

4. A transfer device as claimed in claim 3:

wherein said drive arm includes a drive extension on an opposite side of said drive attachment point from said oscillating drive end;

wherein said tool includes a tool-holder rod which moves parallel to the rectilinear trajectory; and wherein said linkage arms include:

a connection arm parallel to said rod, and having a first end attached to said drive extension and a second end, a rocker arm which is parallel to said drive arm and having a first end attached to said second end of said connection arm, a second end, and a rocker attachment point intermediate said first and second ends thereof by which said rocker arm is mounted for rotation about a rocker axis which rocker axis is parallel to said drive axis, and a guide arm having a first end attached to said second end of said rocker arm and a second end attached to said rod.

5. A transfer device as claimed in claim 4 wherein said drive arm, said driven arm and said coupling arm are located at all times on a rear side of said rocker axis.

6. A transfer device as claimed in claim 5 and further including a moving means synchronized with said drive element for additionally moving said tool transverse to the rectilinear trajectory as said tool is moved from the front position to the rear position.

7. A transfer device as claimed in claim 6 wherein said moving means includes:

a second drive element which moves in an angular motion about a second drive axis in synchronization with the angular motion of said first-mentioned drive element, and a movement arm having a second oscillating driven end attached to said rocker arm at said rocker attachment point, and a second drive attachment point remote from said second drive end at which said movement arm is attached to said second drive element such that said second drive end is driven in rotation about the second drive axis.

8. A transfer device as claimed in claim 4:

wherein said tool includes an operative tool end; and wherein said drive axis is located between said tool and said driven axis and between said tool end and said driven axis.

9. A transfer device as claimed in claim 8 wherein said drive axis and said rocker axis form a plane which is parallel to the rectilinear trajectory of said tool.

10. A transfer device as claimed in claim 4 wherein said drive arm, said driven arm and said coupling arm are located at all times on a front side of said rocker axis.

11. A transfer device as claimed in claim 10 and further including a moving means synchronized with said drive element for additionally moving said tool transverse to the rectilinear trajectory as said tool is moved from the front position to the rear position.

12. A transfer device as claimed in claim 11 wherein said moving means includes a second drive element which moves in an angular motion about said driven axis in synchronization with the angular motion of said first-mentioned drive element, and to which said driven attachment point of said driven arm is attached.

13. A transfer device as claimed in claim 1 and further including an articulated rod which attaches said coupling end of said coupling arm to said driven end of said driven arm.

14. A transfer device as claimed in claim 13 wherein a distance from said tool attachment end of said coupling arm to said drive axis is different from a distance from said tool attachment end of said coupling arm to said driven axis.

15. A transfer device as claimed in claim 14 wherein an angle formed by said coupling arm and said rod always faces said tool.

* * * * *